(12) United States Patent
Schilling

(10) Patent No.: US 6,356,534 B2
(45) Date of Patent: Mar. 12, 2002

(54) SPREAD-SPECTRUM CHANGEABLE BASE STATION

(75) Inventor: Donald L. Schilling, Sands Point, NY (US)

(73) Assignee: InterDigital Technology Corporation, Wilmington, DE (US)

( * ) Notice: Subject to any disclaimer, the term of this patent is extended or adjusted under 35 U.S.C. 154(b) by 0 days.

(21) Appl. No.: 09/878,647

(22) Filed: Jun. 11, 2001

Related U.S. Application Data

(63) Continuation of application No. 09/133,047, filed on Aug. 13, 1998, now Pat. No. 6,295,288, which is a continuation of application No. 08/814,809, filed on Mar. 10, 1997, now Pat. No. 5,926,465, which is a continuation of application No. 08/268,186, filed on Jun. 29, 1994, now Pat. No. 5,610,906.

(51) Int. Cl.$^7$ ............................................... H04J 13/00
(52) U.S. Cl. ................................... 370/261; 370/277
(58) Field of Search ........................... 370/260, 261, 370/267, 277, 278, 342, 474; 375/130, 134, 149

(56) References Cited

U.S. PATENT DOCUMENTS

| | | | | |
|---|---|---|---|---|
| 5,005,183 A | * | 4/1991 | Carey et al. | 375/200 |
| 5,610,906 A | * | 3/1997 | Schilling | 370/261 |
| 5,914,949 A | * | 6/1999 | Li | 370/342 |
| 5,926,465 A | * | 7/1999 | Schilling | 370/261 |

* cited by examiner

*Primary Examiner*—Salvatore Cangialosi
(74) *Attorney, Agent, or Firm*—Volpe and Koenig, P.C.

(57) ABSTRACT

A selected unit of a plurality of units receives data for others of the plurality of units over a first frequency. The selected unit mixes the received data from the other units with data of the selected unit. The selected unit transmits the mixed data over a second frequency. The other units receive the mixed data over the second frequency from the selected unit. Each of the other units transmits its data over the first frequency. One of the other units transmits a command and the one unit operates as the selected unit.

9 Claims, 5 Drawing Sheets

SPREAD-SPECTRUM CHANGEABLE BASE STATION

This application is a continuation of U.S. application Ser. No. 09/133,047, filed Aug. 13, 1998, now U.S. Pat. No. 6,295,288 which is a continuation of U.S. application Ser. No. 08/814,809, filed Mar. 10, 1997, now U.S. Pat. No. 5,926,465, which is a continuation of U.S. application Ser. No. 08/268,186, filed Jun. 29, 1994, now U.S. Pat. No. 5,610,906.

BACKGROUND

This invention relates to spread-spectrum communications, and more particularly, to a method and system for handing off a base station among a plurality of users in a spread-spectrum network.

Spread-spectrum modulation is a well developed art, in terms of generating chipping sequences, and spread-spectrum processing data signals with the chipping sequences. Using this technology, communication links may be established among a transmitter and a receiver in remote locations. Also, networks may be established, using a conference calling spread-spectrum technique. Conference calling spread-spectrum techniques are disclosed in U.S. Pat. No. 5,179,572 entitled SPREAD SPECTRUM CONFERENCE CALLING SYSTEM AND METHOD, to Schilling, and in U.S. Pat. No. 5,263,045, entitled SPREAD SPECTRUM CONFERENCE CALL SYSTEM AND METHOD, to Schilling.

A problem may exist where a spread-spectrum conference calling system is set up, but the base station may need to change hands. For example, in a military environment, a platoon may use spread-spectrum modulation for conference calling among the members of the platoon. A particular unit in the platoon may be designated as the base station. The cited prior art does not teach how to change a base station from one platoon to another or what would happen among units in the platoon in the event it became necessary to effectuate such a change.

SUMMARY

A selected unit of a plurality of units receives data for others of the plurality of units over a first frequency. The selected unit mixes the received data from the other units with data of the selected unit. The selected unit transmits the mixed data over a second frequency. The other units receive the mixed data over the second frequency from the selected unit. Each of the other units transmits its data over the first frequency. One of the other units transmits a command and the one unit operates as the selected unit.

BRIEF DESCRIPTION OF THE DRAWING(S)

The accompanying drawings, which are incorporated in and constitute a part of the specification, illustrate preferred embodiments of the invention, and together with the description serve to explain the principles of the invention.

DETAILED DESCRIPTION OF THE PREFERRED EMBODIMENT(S)

Figure 1A:
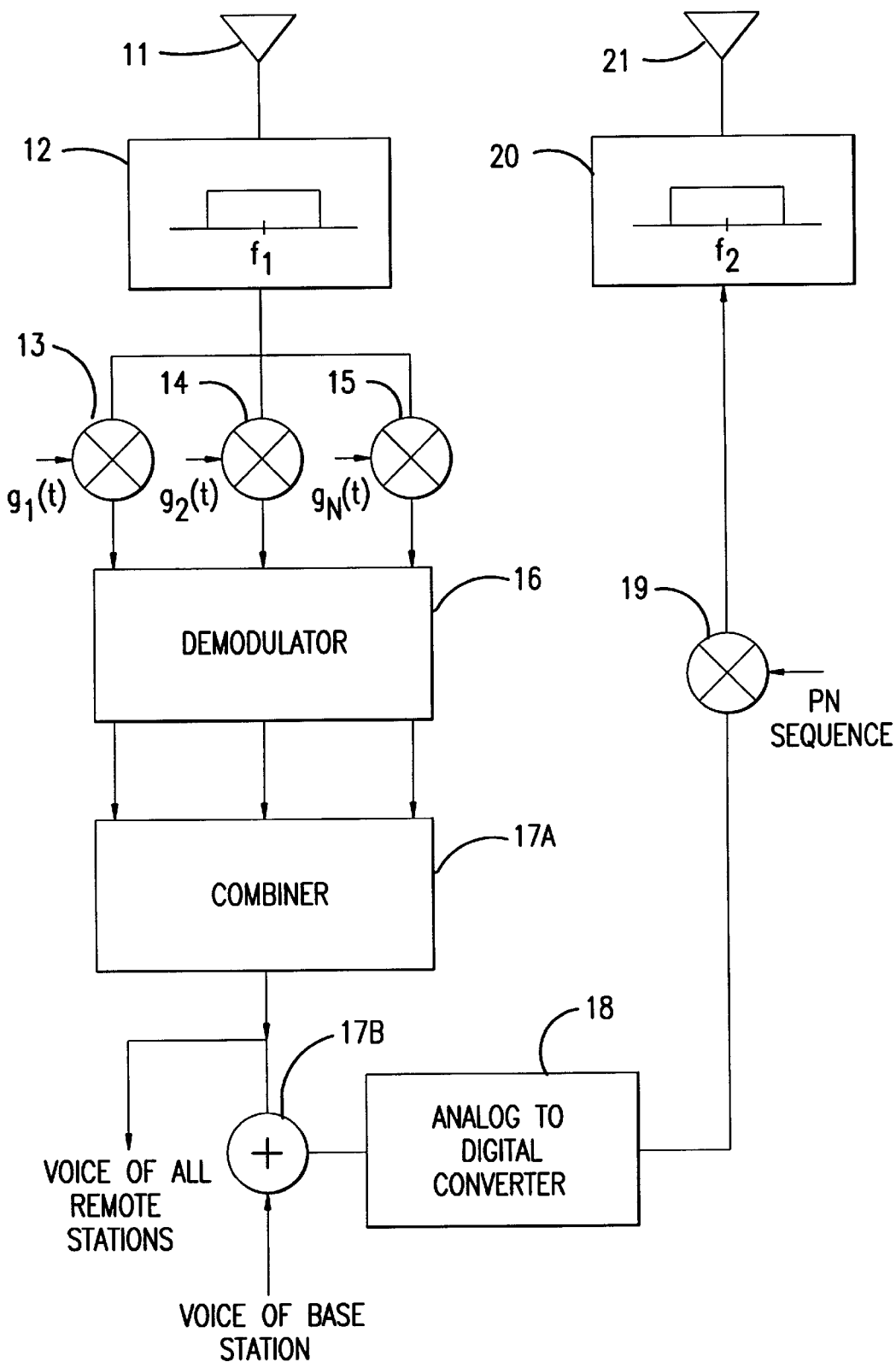
FIG. 1A is a block diagram of a base subunit using a plurality of mixers.

Reference now is made in detail to the present preferred embodiments of the invention, examples of which are illustrated in the accompanying drawings, wherein like reference numerals indicate like elements throughout the several views.

The present invention provides a unique solution to the problem of a plurality of spread spectrum units in use in a mobile environment in which any one of the spread-spectrum units is vulnerable to neutralization while maintaining communication between all the spread-spectrum units remains crucial. The spread-spectrum changeable base station finds application in a platoon of units, in an army environment, or in a law enforcement application, where a transportable base station might be set up for controlling a plurality of spread spectrum remote units. The problem being addressed for each of these applications is what happens when the base unit becomes disabled or nonfunctional. In the military environment, the base station may be destroyed. In a law enforcement situation, the mobility of the plurality of spread-spectrum units may have a requirement that the base station change from one unit to another.

The spread-spectrum system has a plurality of spread-spectrum units, with each spread-spectrum unit having a base subunit, a remote subunit, and a command subunit. The use of the term "subunits" for designating the base subunit, remote subunit, and command subunit, is for purposes of illustrating the invention. The invention may be built as one totally integrated unit, or as a mixture of more than one unit.

Figure 1B:
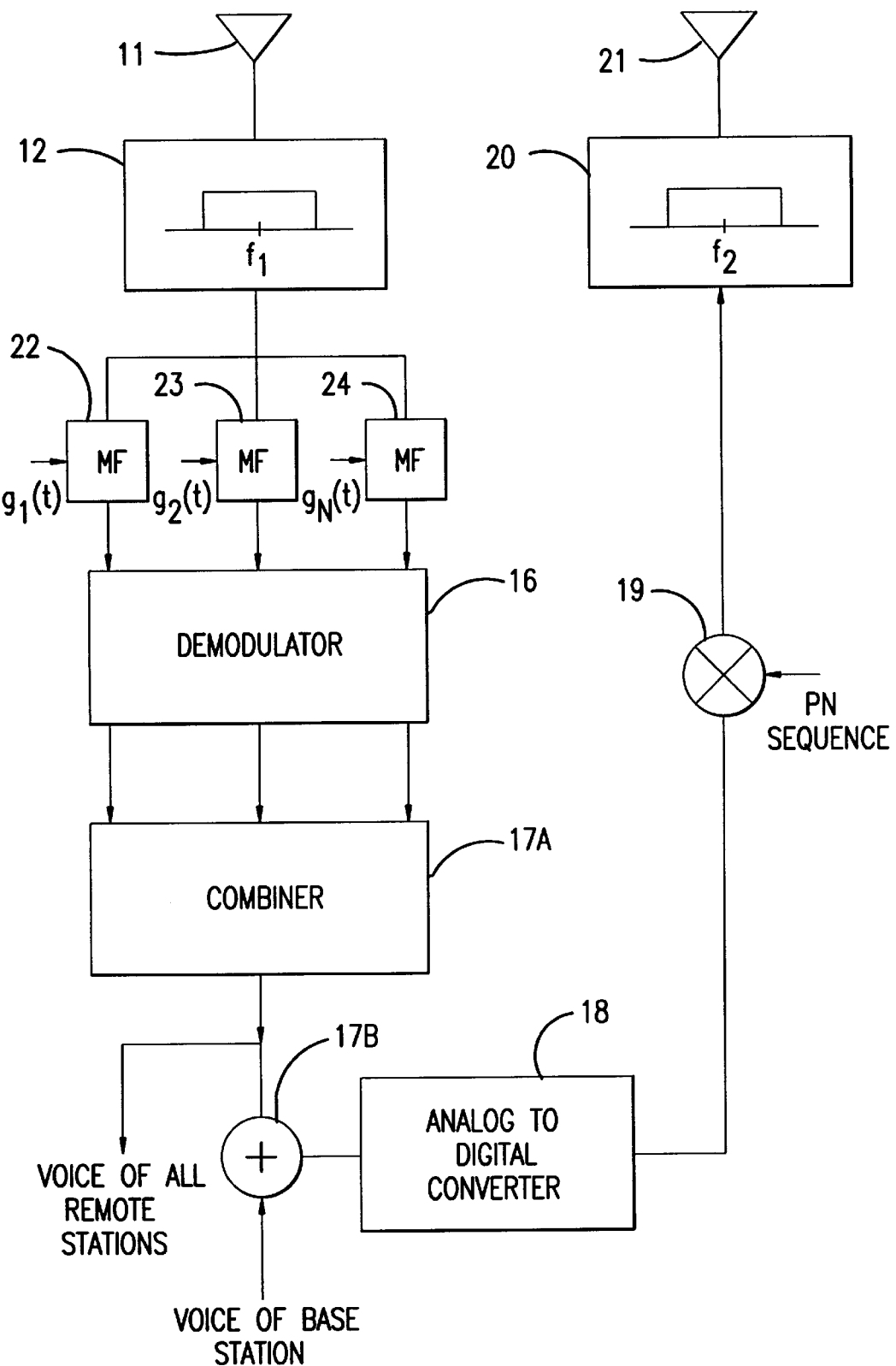
FIG. 1B is a block diagram of a base subunit using a plurality of matched filters.

The base subunit is illustratively shown in FIGS. 1A and 1B. The base subunit includes receiving means, despreading means, demodulating means, combining means, converting means, spread-spectrum processing means, and transmitting means. The despreading means is coupled between the receiving means and the demodulating means. The combining means is coupled to the demodulating means and the converting means. The spread-spectrum processing means is coupled to the converting means and the transmitting means.

The receiving means is shown in FIG. 1A as antenna 11 coupled to radio frequency/intermediate frequency (RF/IF) amplifier and filter section 12. The despreading means is illustrated as a plurality of mixers 13, 14, 15. As shown in FIG. 1B, the despreading means may also be embodied as a plurality of matched filters 22, 23, 24. Each of the plurality of mixers 13, 14, 15 has a chipping-sequence $g_1(t)$, $g_2(t)$, . . . , $g_N(t)$, respectively, for mixing with the received spread-spectrum signal. The plurality of chipping sequences is matched to the chipping sequence of the desired spread-spectrum signal to be despread.

The demodulating means and combining means is shown as the demodulator 16 and combiners 17A, 17B. Combiners 17A, 17B may be a single combiner performing the combining function, or separate combiners. The converting means is shown as an analog-to-digital converter 18. The spread-spectrum processing means is illustrated as product device 19, having a chipping sequence for spreading the data signal from analog-to-digital converter 18. The transmitting means is illustrated as transmitter 20 and antenna 21.

The RF/IF amplifier and filter circuits 12 are coupled to the antenna 11 and to the plurality of mixers 13, 14, 15. The plurality of mixers 13, 14, 15 is coupled to the demodulator 16 and combiner 17A, 17B. The analog-to-digital converter 18 is coupled to the combiner 17B and to the product device 19. The transmitter 20 is coupled to the product device 19 and to antenna 21. Antenna 21 and antenna 11 may be the same antenna with the appropriate isolation circuits, or different antennas. The RF/IF amplifier and filter circuits 12 receive at a first frequency, $f_1$, a plurality of spread-spectrum signals transmitted from the plurality of spread-spectrum units. The plurality of spread-spectrum signals are despread by the plurality of mixers 13, 14, 15. As shown in FIG. 1B, the despreading means may also be embodied as a plurality of matched filters 22, 23, 24. The output of the plurality of mixers 13, 14, 15 is a plurality of despread-spread-spectrum signals. The demodulator 16 demodulates the plurality of despread-spread-spectrum signals to generate a plurality of demodulated signals. The combiner 17A combines the plurality of demodulated signals. The combined plurality of demodulated signals and a local signal from the base station may be combined by second combiner 17B to generate a combined signal. The term "combined signal", as used herein, is an analog signal including the voice of the base station and the combined demodulated signals of the combiners 17A, 17B.

The combined signal is converted to a base-data signal by analog-to-digital converter 18. The term "base-data signal," as used herein, is the digital signal coming from the analog-to-digital converter 18, and includes the converted analog signals and the data signal at the base station.

The product device 19 spread-spectrum processes the base-data signal from analog-to-digital converter 18, with a base-chipping sequence. The spread-spectrum-processed-base-data signal is transmitted as a base-spread-spectrum signal by transmitter 20 at the second frequency $f_2$. Antenna 11 and antenna 21 may be a single antenna, serving both the receiver and transmitter.

Figure 2A:
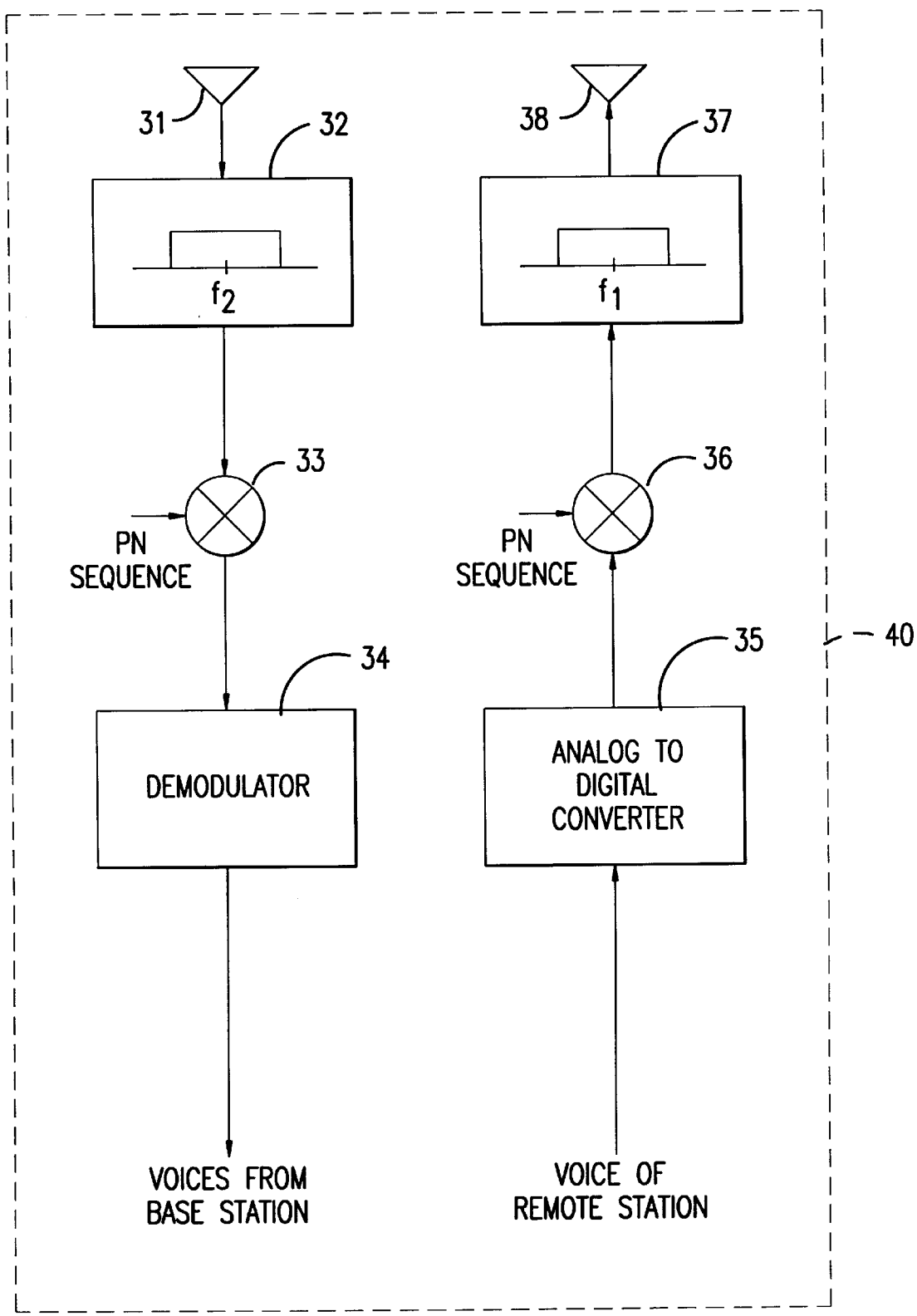
FIG. 2A is a block diagram of a remote subunit using a mixer.
Figure 2B:
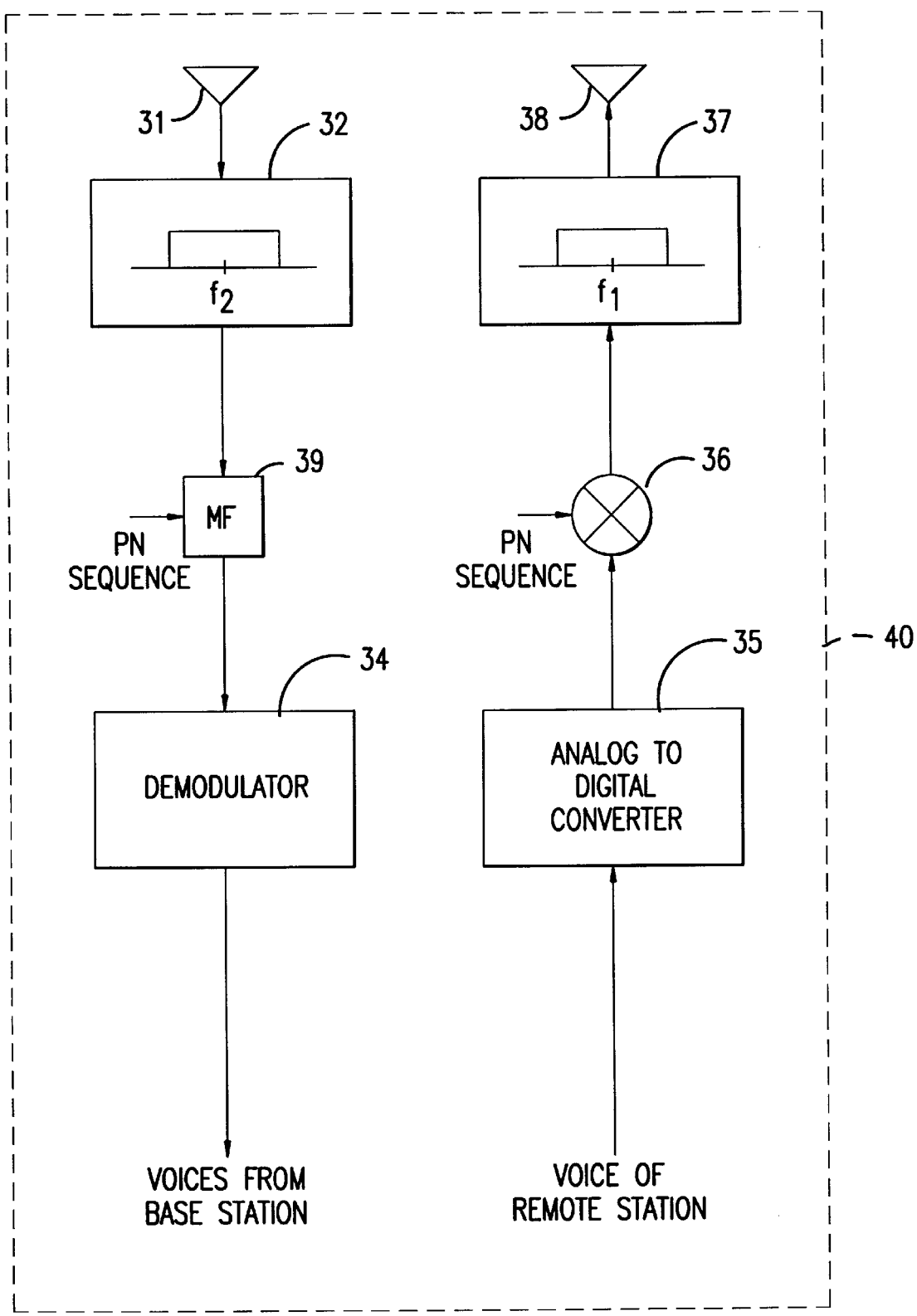
FIG. 2B is a block diagram of a remote subunit using a matched filter.

The remote subunit is illustrated in FIGS. 2A and 2B and includes a receiver portion, a transmitter portion, receiving means, despreading means, and demodulating means. The transmitting portion includes converting means, spread-spectrum processing means and transmitting means. The receiving means receives at the second frequency the base-spread-spectrum signal. The despreading means despreads the base-spread-spectrum signal as a despread-base-spread-spectrum signal. The demodulating means demodulates the despread-base-spread-spectrum signal as a base-analog signal.

The converting means converts a remote-analog signal to a remote-data signal. The remote-analog signal typically is the voice of the remote station. The base-analog signal typically is the plurality of voice signals from the base station. The spread-spectrum processing means processes the remote-data signal with a remote-chipping sequence. The transmitting means transmits at the first frequency the spread-spectrum-processed-remote-data signal as one of the plurality of spread-spectrum signals, which are received at the base subunit.

As shown in FIG. 2A, the receiving means includes an antenna 31 and RF/IF amplifier and filter circuitry 32. The despreading means and demodulating means are embodied as mixer 33 and demodulator 34, respectively. As shown in FIG. 2B, the despreading means may also be embodied as a matched filter 39. The RF/IF amplifier and circuitry 32 is coupled between antenna 31 and the mixer 33. The demodulator 34 is coupled to the mixer 33.

The base-spread-spectrum signal at antenna 31 is amplified and filtered by RF/IF. The base-spread-spectrum signal is despread by the base-chipping sequence by mixer 33 to generate the despread-base-spread-spectrum signal. The demodulator 34 demodulates the despread-base-spread-spectrum signal as a base-analog signal. The output of the demodulator 34 is the plurality of voice signals from the base station.

The transmitter section of the remote subunit may have the converting means embodied as analog-to-digital converter 35, the spread-spectrum processing means embodied as product device 36 and the transmitting means embodied as transmitter 37 coupled to antenna 38. The product device 36 is coupled between the analog-to-digital converter 35 and the transmitter 37.

The analog-to-digital converter 35 converts the voice of the remote signal, designated here as the remote-analog signal, to a remote-data signal. The remote-data signal is spread-spectrum processed by the product device 36 using remote-chipping sequence. The output of the product device 36 is the spread-spectrum-processed-remote-data signal. The transmitter 37 transmits the spread-spectrum-processed-remote-data signal using antenna 38, as one of the plurality of spread-spectrum signals. Antenna 31 and antenna 38 may be combined as a single antenna serving both functions.

Figure 3:
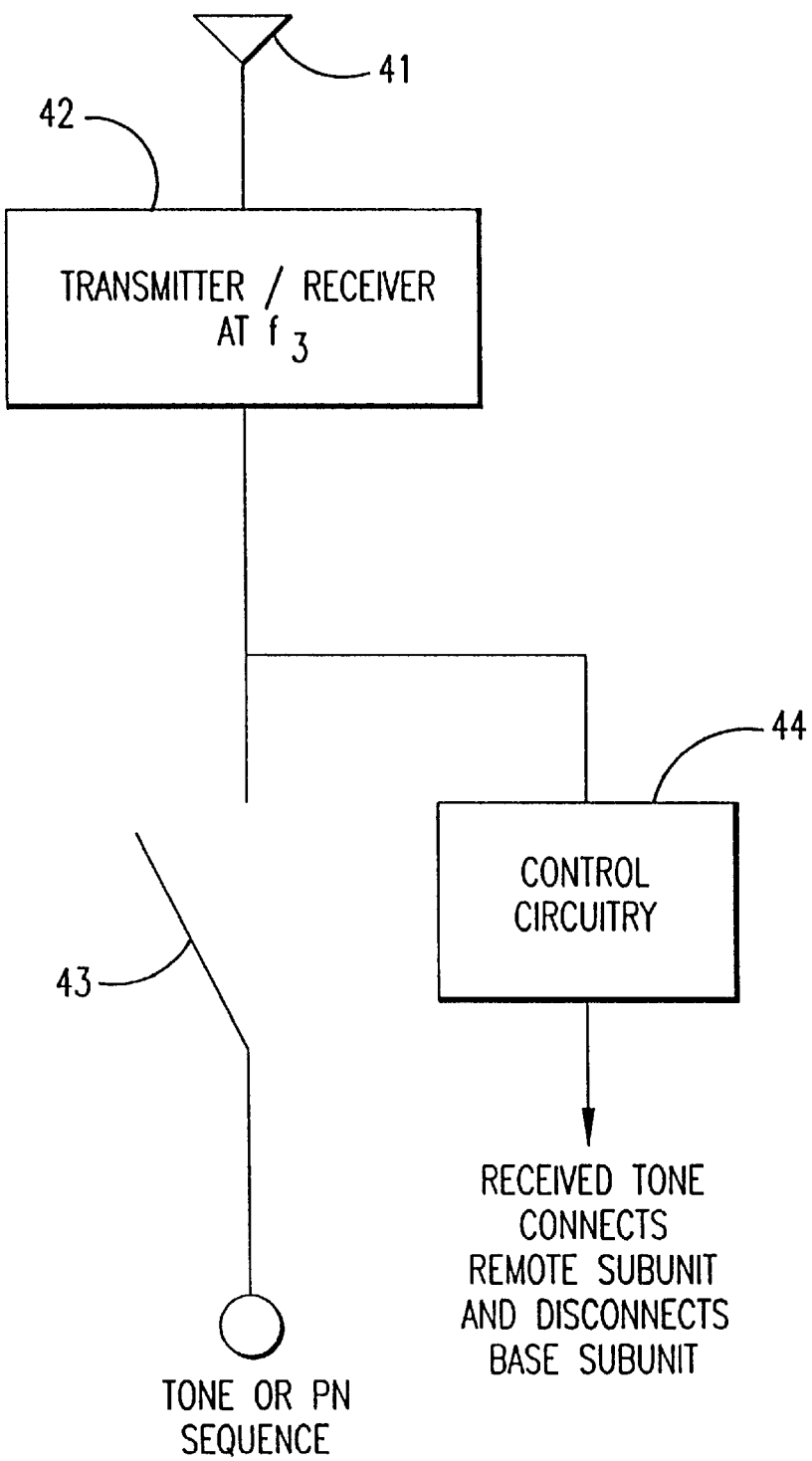
FIG. 3 is a block diagram of a command subunit.

The command subunit is illustrated in FIG. 3. The command subunit includes initiating means, broadcasting means, and receiving means. The initiating means initiates a command signal, upon activation by the local user of that spread-spectrum unit. The command signal activates the base subunit in that spread-spectrum unit. The broadcasting means broadcasts the command signal to the plurality of spread-spectrum units. The receiving means receives the command signal when broadcast from a different spread-spectrum unit. The activating means activates the remote subunit upon receiving the command signal.

The initiating means is illustrated in FIG. 3 as a push button switch 43. The broadcasting means is illustrated as a transmitter portion of the transmitter/receiver 42. The transmitter transmits at frequency $f_3$. The receiving means is illustrated as the receiver portion of transmitter/receiver 42. The receiver receives at frequency $f_3$. The transmitter/receiver 42 is coupled to antenna 41 for radiating and receiving signals. The activating means includes the necessary circuitry for disconnecting the base subunit and activating the remote subunit of a particular spread-spectrum unit. The activating means is illustrated as control circuitry 44. The present invention may also be used for data in place of voice signals.

In use, a particular spread-spectrum unit might be operating with its remote subunit activated. Thus, the remote subunit of that particular spread-spectrum unit receives at the second frequency the base-spread-spectrum signal, and despreads the base-spread-spectrum signal as a despread-base-spread-spectrum signal. The despread-base-spread-spectrum signal is demodulated. Thus, that particular spread-spectrum unit receives all of the base signals via its remote subunit. While transmitting to the plurality of spread-spectrum units, that particular spread-spectrum unit converts the voice signal, embodied as the remote-analog signal, to the remote-data signal. The remote-data signal is spread-spectrum processed and transmitted at the first frequency as one of the plurality of spread-spectrum signals.

Upon initiation of the command signal by the user of that particular spread-spectrum unit, by pushing push button 43, that particular spread-spectrum unit switches from operating with the remote subunit to operating with the base subunit. At the same time, the command signal is radiated to the other spread-spectrum units of the plurality of spread-spectrum units. Upon receiving the command signal, each of the spread-spectrum units has its remote subunit activated and thereafter works in a remote subunit mode. The particular spread-spectrum unit has then become the base station.

When operating as the base station, the particular spread-spectrum unit has its base subunit activated. Accordingly, the plurality of spread-spectrum signals transmitted from the plurality of spread-spectrum units at each unit, is received by the RF/IF amplifier and circuitry 12 via antenna 11. The plurality of spread-spectrum signals are despread by the plurality of mixers 13, 14, 15, and demodulated by the demodulator 16 which outputs a demodulated signal. The plurality of demodulated signals from combiner 17A are the voices from the plurality of remote stations. The voices from the plurality of remote stations are combined with the voice of the base station by combiner 17B, and converted by analog-to-digital converter 18 to the base-data signal. The base-data signal is spread-spectrum processed by the product device 19 and transmitted by transmitter 20 and via antenna 21 at the second frequency.

It will be apparent to those skilled in the art that various modifications can be made to the spread-spectrum changeable base station of the instant invention without departing from the scope or spirit of the invention, and it is intended that the present invention cover modifications and variations of the spread-spectrum changeable base station provided they come within the scope of the appended claims and their equivalents.

What is claimed is:

1. A method for conference calling in a wireless spread spectrum communication system having a plurality of units, the method comprising:
   a selected unit of the plurality of units receiving data for others of the plurality of units over a first frequency;
   the selected unit mixing the received data from the other units with data of the selected unit and transmitting the mixed data over a second frequency;
   the other units receiving the mixed data over the second frequency from the selected unit;
   each of the other units transmitting its data over the first frequency; and
   transmitting a command from one of the other units; wherein the one unit operates as the selected unit.

2. The method of claim 1 further comprising the selected unit receives the command and operates as the other units.

3. The method of claim 1 further comprising an operator of the one unit using a switch to initiate the command transmitting.

4. A system for use in a wireless spread spectrum communication system having a plurality of units, the system comprising:
   the plurality of units, each unit comprising:
      a base subunit for receiving data from others of the plurality of units over a first frequency, mixing the received data from the other units with data of that unit and transmitting the mixed data over a second frequency;
      a remote subunit for receiving the mixed data over the second frequency and transmitting data of that unit over the first frequency; and
      a control subunit for selectively activating the base and remote subunits.

5. The system of claim 4 wherein the control subunit upon receiving a command, activates the remote subunit and deactivates the base subunit.

6. The system of claim 4 wherein the control subunit in response to a switch, activates the base subunit, deactivates the remote subunit and transmits a command.

7. A unit for use in a wireless spread spectrum communication system having a plurality of other units, the unit comprising:
   a base subunit for receiving data from others of the plurality of units over a first frequency, mixing the received data from the other units with data of that unit and transmitting the mixed data over a second frequency; and
   a remote subunit for receiving the mixed data over the second frequency and transmitting data of that unit over the first frequency; and
   a control subunit for selectively activating the base and remote subunits.

8. The unit of claim 7 wherein the control subunit upon receiving a command, activates the remote subunit and deactivates the base subunit.

9. The unit of claim 7 wherein the control subunit in response to a switch, activates the base subunit, deactivates the remote subunit and transmits a command.

* * * * *